United States Patent
Wolf et al.

(10) Patent No.: US 9,754,430 B1
(45) Date of Patent: Sep. 5, 2017

(54) METHOD AND APPARATUS FOR PROVIDING INSTRUCTIONS ABOUT MANUAL RELEASE

(71) Applicant: GM Global Technology Operations LLC, Detroit, MI (US)

(72) Inventors: Calvin E. Wolf, Sterling Heights, MI (US); Jeffrey J. Calderas, Royal Oak, MI (US); David T. Proefke, Troy, MI (US); Richard J. Lange, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 15/177,578

(22) Filed: Jun. 9, 2016

(51) Int. Cl.
  *B60Q 1/00* (2006.01)
  *G07C 5/08* (2006.01)
  *B60C 9/00* (2006.01)

(52) U.S. Cl.
  CPC ............. *G07C 5/0816* (2013.01); *B60C 9/00* (2013.01); *G07C 5/0825* (2013.01); *G07C 5/0833* (2013.01)

(58) Field of Classification Search
  CPC ....... G07C 5/0186; G07C 5/0825; B60Q 9/00
  USPC ........... 340/425.5, 426.1, 538, 539.1, 539.11
  See application file for complete search history.

(56) References Cited

U.S. PATENT DOCUMENTS

2009/0224879 A1\* 9/2009 Nakazawa ......... G07C 9/00309
  340/5.72

\* cited by examiner

*Primary Examiner* — Daryl Pope

(57) ABSTRACT

A method and apparatus for providing instructions to operate a manual release are provided. The method includes detecting a condition for providing a notification to operate a manual release of the vehicle; and controlling to output the notification to operate the manual release based on the detected condition. The apparatus and method may be used in a vehicle or other apparatus to prevent a user from being hindered from egress in a vehicle during times at which the electronic door release is not operable.

14 Claims, 5 Drawing Sheets

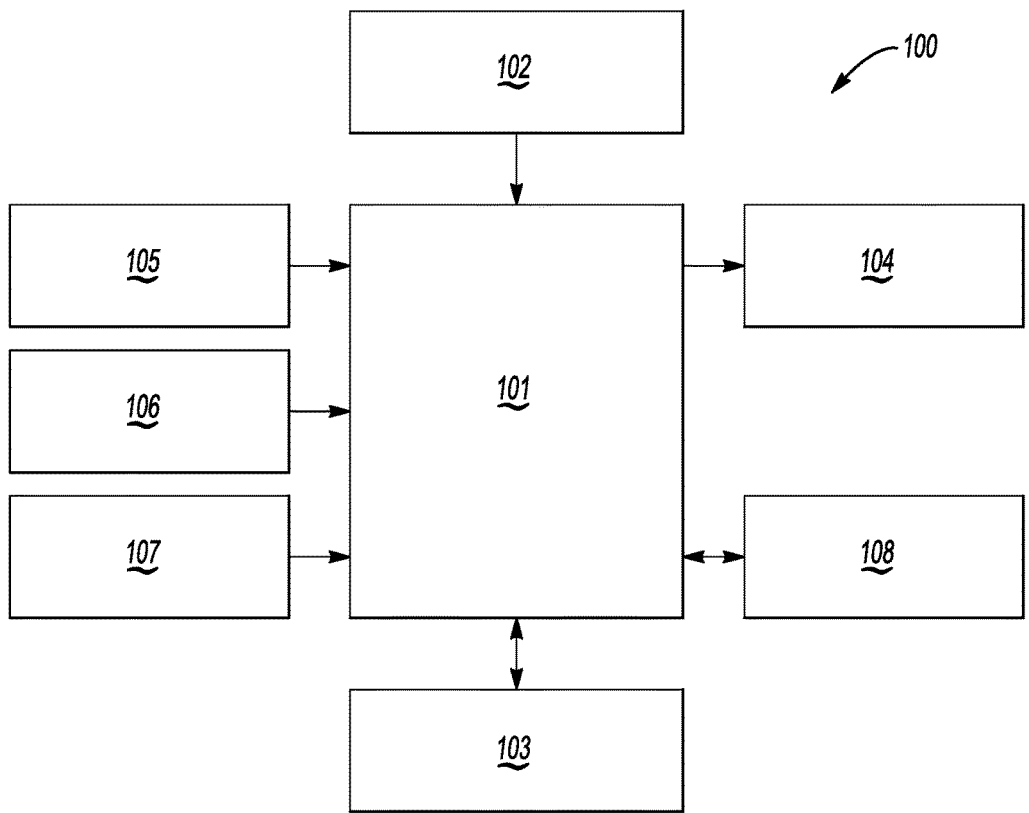
_Fig-1_
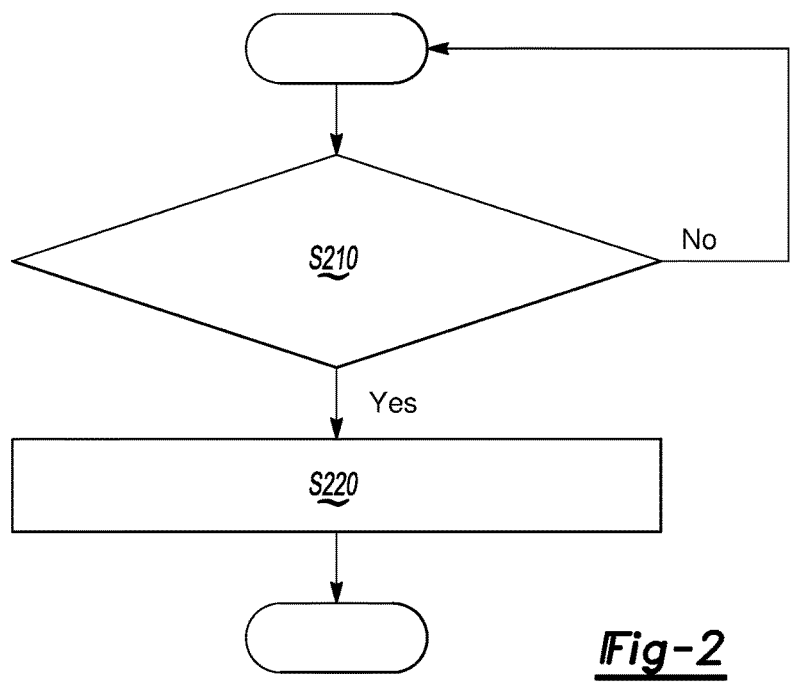
_Fig-2_

| Condition | Provide Notification |
|---|---|
| Predetermined Number of Ignition Cycles | Yes |
| Electronic Door Release Failure | Yes |
| Electrical System Failure | Yes |
| Charging System Failure | Yes |
| Low Power Battery Condition | Yes |
| Door Lock Switch Failure | Yes |
| Door Latch Release Switch Failure | Yes |
| Body Control Module Failure | Yes |
| Passive Entry Module Failure | Yes |
| Passive Start Module Failure | Yes |
| Key Fob Transmitter Not in Vehicle | Yes |

*Fig-3*

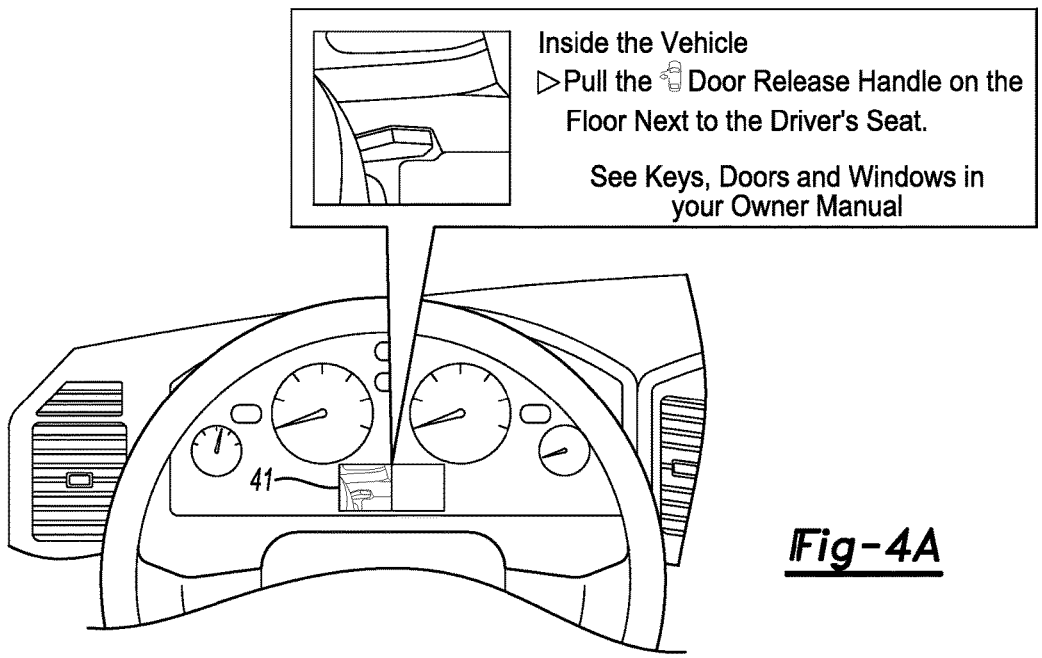

*Fig-4A*

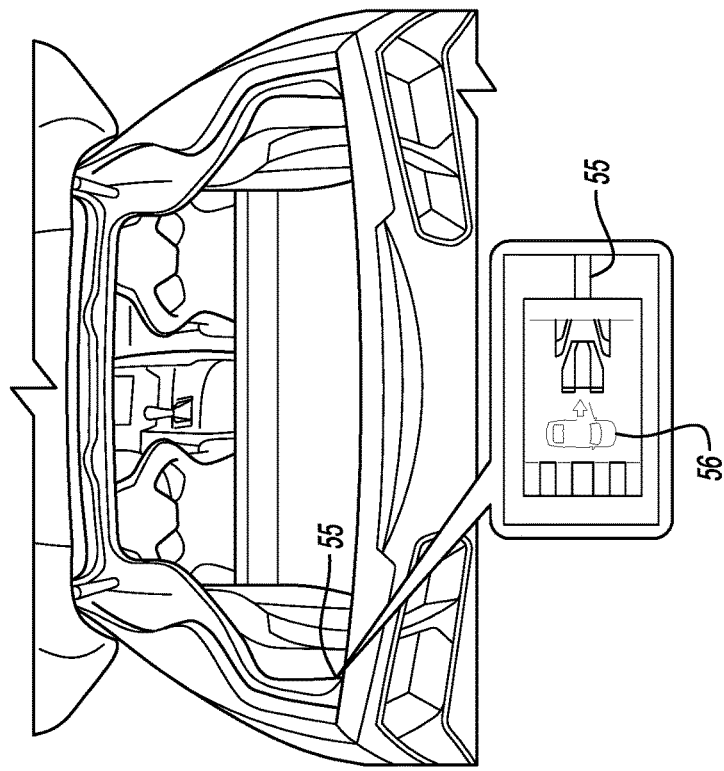
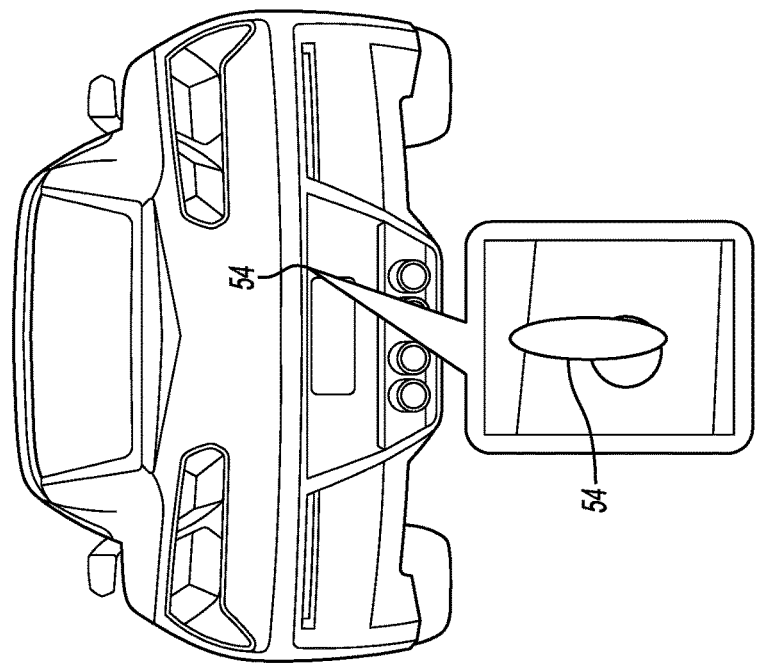
Fig-5B

METHOD AND APPARATUS FOR PROVIDING INSTRUCTIONS ABOUT MANUAL RELEASE

INTRODUCTION

Apparatuses and methods consistent with exemplary embodiments relate to door latches and releases. More particularly, methods consistent with exemplary embodiments relate to manually operated releases for electronically operated door latches.

SUMMARY

One or more exemplary embodiments provide a method and an apparatus that instruct users on how to operate a manual release. More particularly, one or more exemplary embodiments provide a method and an apparatus to instruct a user to operate a manual door release of vehicle instead of an electronic release.

According to an aspect of an exemplary embodiment, a method for providing instructions to operate a manual release in a vehicle is provided. The method includes detecting a condition for providing a notification to operate a manual release of the vehicle; and controlling to output the notification to operate the manual release based on the detected condition.

The condition for providing a notification to operate a manual release may include at least one from among a predetermined number of ignition cycles, an electronic door release failure, an electrical system failure, a charging system failure, a low power battery condition, a post-crash condition, and a vehicle shut down condition.

The notification may include at least one from among an audible notification, a light notification, a display notification including instructions on how to operate a manual release, a display notification including instructions on a location of a manual release, a spoken notification on including instructions on a location of a manual release, a spoken notification on including instructions how to operate a manual release, both a display notification and a spoken notification, and a notification including one or more of visual feedback, audible feedback, and haptic feedback.

The controlling to output the notification may include controlling to transmit the notification to at least one from among a mobile device or the vehicle.

The controlling to output the notification may include controlling to output the notification to at least one from among an interior of the vehicle, an exterior of the vehicle, or a mobile device.

The controlling to output the notification may include controlling to output the notification through a speaker or other audible transducer of at least one from among a mobile device or the vehicle.

The controlling to output the notification may include controlling to output the notification at a display of at least one from among a mobile device or the vehicle.

The controlling to output the notification may include controlling to illuminate an indicator light of at least one from among an instrument cluster and the manual release.

The vehicle may include a manual release and an electronic door release and the controlling to output the notification may include controlling to output instructions to operate the manual release instead of the electronic door release.

According to an aspect of an exemplary embodiment, a non-transitory computer readable medium comprising computer executable instructions is executable by a processor to perform the method for providing instructions to operate a manual release in a vehicle.

According to an aspect of another exemplary embodiment, an apparatus for providing instructions to operate a manual release is provided. The apparatus includes at least one memory comprising computer executable instructions; and at least one processor configured to read and execute the computer executable instructions. The computer executable instructions cause the at least one processor to: detect a condition for providing a notification to operate a manual release; and control to output the notification to operate the manual release based on the detected condition.

The condition for providing a notification to operate a manual release may include at least one from among a predetermined number of ignition cycles, an electronic door release failure, an electrical system failure, a charging system failure, a low power battery condition, a post-crash condition, and a vehicle shut down condition.

The notification may include at least one from among an audible notification, a light notification, a display notification including instructions on how to operate a manual release, a display notification including instructions on a location of a manual release, a spoken notification on including instructions on a location of a manual release, a spoken notification on including instructions how to operate a manual release, both a display notification and a spoken notification, and a notification including one or more of visual feedback, audible feedback, and haptic feedback.

The at least one processor may be further configured to control to output the notification by controlling to transmit the notification to at least one from among a mobile device or the vehicle.

The at least one processor may be further configured to control to output the notification by controlling to output the notification to at least one from among an interior of the vehicle, an exterior of the vehicle, or a mobile device.

The at least one processor may be further configured to control to output the notification by controlling to output the notification through a speaker or other audible transducer of at least one from among a mobile device or the vehicle.

The at least one processor may be further configured to control to output the notification by controlling to output the notification at a display of at least one from among a mobile device or the vehicle.

The at least one processor may be further configured to control to output the notification by controlling to illuminate an indicator light of at least one from among an instrument cluster and the manual release.

The apparatus may further include a vehicle comprising comprises a manual release and an electronic door release, and the at least one processor may be further configured to control to output the notification by controlling to output instructions to operate the manual release instead of the electronic door release.

According to an aspect of another exemplary embodiment, a non-transitory computer readable medium comprising computer executable instructions executable by a processor to perform a method for providing instructions to operate a manual release is provided. The method includes detecting a condition for providing a notification to operate a manual release instead of an electronic release; and controlling to output the notification to operate the manual release based on the detected condition.

Other objects, advantages and novel features of the exemplary embodiments will become more apparent from the following detailed description of exemplary embodiments and the accompanying drawings.

BRIEF DESCRIPTION OF THE DRAWINGS

FIG. 1 shows a block diagram of an apparatus that provides instructions to operate a manual release according to an exemplary embodiment;

FIG. 2 shows a flowchart for a method of providing instructions to operate a manual release according to an exemplary embodiment;

FIG. 3 shows a table of conditions for providing a notification to operate a manual release according to an aspect of an exemplary embodiment;

FIG. 4A shows an example of a first type of notification to operate a manual release according to an aspect of another exemplary embodiment;

FIG. 5B shows an example of a second type of manual release according to an aspect of another exemplary embodiment.

DETAILED DESCRIPTION

Figure 4B:
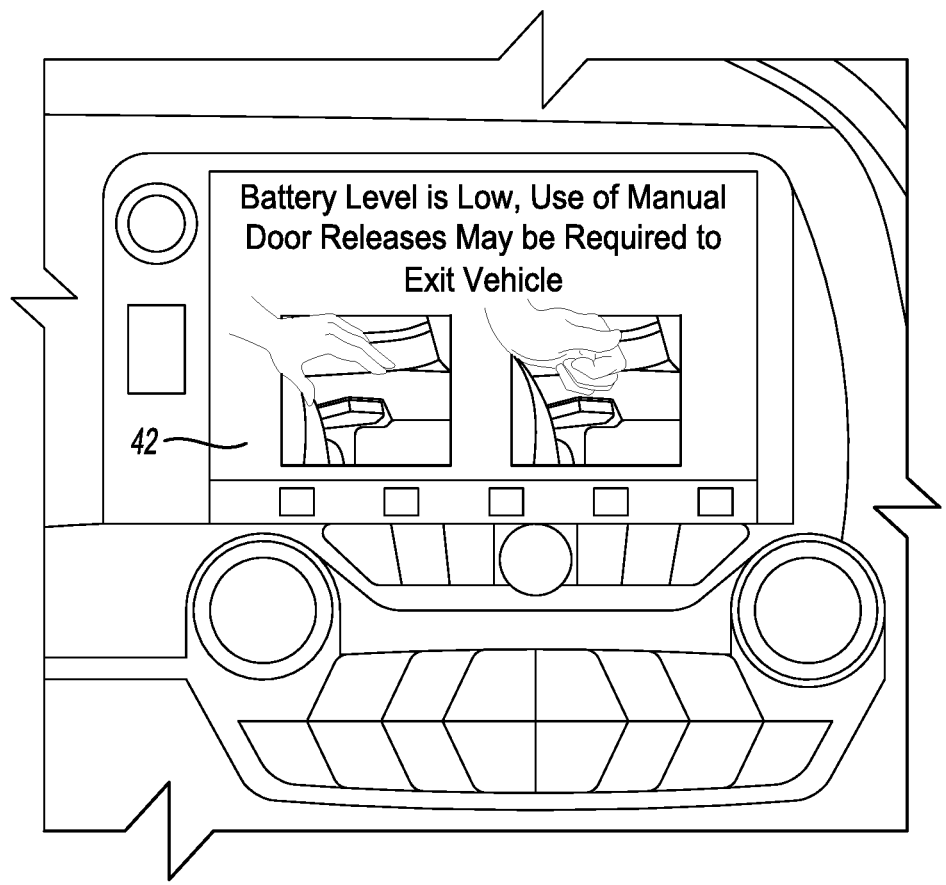
FIG. 4B shows an example of a second type notification to operate a manual release according to an aspect of another exemplary embodiment.

An apparatus and method that instruct a user on operating a manual release will now be described in detail with reference to FIGS. 1-5B of the accompanying drawings in which like reference numerals refer to like elements throughout.

The following disclosure will enable one skilled in the art to practice the inventive concept. However, the exemplary embodiments disclosed herein are merely exemplary and do not limit the inventive concept to exemplary embodiments described herein. Moreover, descriptions of features or aspects of each exemplary embodiment should typically be considered as available for aspects of other exemplary embodiments.

It is also understood that where it is stated herein that a first element is "connected to," "formed on," or "disposed on" a second element, the first element may be connected directly to, formed directly on or disposed directly on the second element or there may be intervening elements between the first element and the second element, unless it is stated that a first element is "directly" connected to, formed on, or disposed on the second element. In addition, if a first element is configured to "receive" information from a second element, the first element may receive the information directly from the second element, receive the information via a bus, receive the information via a network, or receive the information via intermediate elements, unless the first element is indicated to receive information "directly" from the second element.

Throughout the disclosure, one or more of the elements disclosed may be combined into a single device or combined into one or more devices. In addition, individual elements may be provided on separate devices.

A manual release may be a mechanical device that releases or opens a latch, lock, trunk, door etc. when a mechanical force is applied to the release or release lever by a user. For example, a manual release may be pull or push lever that is operable to open a door or a trunk of vehicle if a force is applied to the release by a user.

FIG. 1 shows a block diagram of a manual release instruction apparatus 100 (i.e., an apparatus for providing instructions to operate a manual release) according to an exemplary embodiment. As shown in FIG. 1, the manual release instruction apparatus 100, according to an exemplary embodiment, includes a controller 101, a power supply 102, a storage 103, an output 104, an electronic release 105, a user input 106, a condition detector 107, and a communication device 108. However, the manual release instruction apparatus 100 is not limited to the aforementioned configuration and may be configured to include additional elements and/or omit one or more of the aforementioned elements.

The controller 101 controls the overall operation and function of the manual release instruction apparatus 100. The controller 101 may control one or more of a storage 103, an output 104, an electronic release 105, a user input 106, a condition detector 107, and a communication device 108 of the manual release instruction apparatus 100. The controller 101 may include one or more from among a processor, a microprocessor, a central processing unit (CPU), a graphics processor, Application Specific Integrated Circuits (ASICs), Field-Programmable Gate Arrays (FPGAs), state machines, and a combination of hardware, software and firmware components.

The power supply 102 provides power to one or more of the controller 101, the storage 103, the output 104, the electronic release 105, the user input 106, the condition detector 107, and the communication device 108 of the manual release instruction apparatus 100. The power supply 102 may include one or more from a battery, an outlet, a capacitor, a solar energy cell, a generator, a wind energy device, an alternator, etc.

The storage 103 is configured for storing information and retrieving information used by the manual release instruction apparatus 100. The storage 103 may be controlled by the controller 101 to store and retrieve condition information such as a condition of devices or aspects of a vehicle electrical system or the electronic release 105, etc. The storage 103 may include one or more from among floppy diskettes, optical disks, CD-ROMs (Compact Disc-Read Only Memories), magneto-optical disks, ROMs (Read Only Memories), RAMs (Random Access Memories), EPROMs (Erasable Programmable Read Only Memories), EEPROMs (Electrically Erasable Programmable Read Only Memories), magnetic or optical cards, flash memory, cache memory, and other type of media/machine-readable medium suitable for storing machine-executable instructions.

The storage 103 may include a database that is configured to store condition information of the electrical system of the vehicle or other apparatus being used in conjunction with the electronic release and the manual release. For example, an entry in the database may include one or more values for conditions of a device or a vehicle along with a setting indicating whether manual release instructions are to be output. The storage 103 may also include the computer instructions configured to be executed by a processor to perform the functions of the manual release instruction apparatus 100.

The output 104 outputs information one or more forms, including: in visual, audible and haptic. The output 104 may be controlled by the controller 101 to provide outputs to the user of the manual release instruction apparatus 100. The output 104 may include one or more from among a speaker, a piezoelectric actuator, a centrally-located a display, a head up display, a windshield display, haptic feedback device, a vibration device, a tactile feedback device, a tap-feedback device, a holographic display, an instrument light, an indicator light on or near a manual release lever, a spotlight directed to a manual release lever etc.

The output 104 may output notification including one or more from among an audible notification, a light notification, a display notification including instructions on how to operate a manual release, a display notification including instructions on a location of a manual release, a spoken notification including instructions on a location of a manual release, a spoken notification including instructions how to operate a manual release, and both a display notification and a spoken notification.

The electronic release 105 is configured to release and/or engage a lock, open a door, or open an entrance to a vehicle. Alternatively, the electronic release 105 may be configured to release and/or engage a lock, a latch or open a trunk or storage compartment of a vehicle.

The user input 106 is configured to provide information and commands to the manual release instruction apparatus 100. The user input 106 may be used to provide user inputs, etc. to the controller 101. The user input 106 may include one or more from among a touchscreen, a keyboard, a soft keypad, a button, a motion detector, a voice input detector, a microphone, a camera, a trackpad, a mouse, a touchpad, etc. The user input 106 may be configured to receive a user input to acknowledge or dismiss the notification output by the output 104. The user input 106 may also be configured to receive a user input to cycle through notifications or different screens of a notification that instruct a user on operating a manual release that are output by the output 104.

The condition detector 107 is configured to detect a condition for providing a notification to operate a manual release and to provide information on the condition to the controller 101 of the manual release instruction apparatus 100. The condition detector 107 may detect a condition for providing a notification to operate a manual release such as one or more of a predetermined number of ignition cycles, an electronic door release failure, an electrical system failure, a charging system failure, a low power or battery condition, a post-crash condition, and vehicle shut down condition. The condition for providing the notification may be received from one or more sensors or devices that capture information about the vehicle, may be read from storage 103 where it may be stored in a table or algorithm, or received via communication device 108.

Moreover, in an exemplary embodiment, the condition detector 107 may be configured to receive vehicle context information and provide the information to the controller 101 of the manual release instruction apparatus 100. The condition detector 107 may be used to provide vehicle context information, etc., to the controller 101. The vehicle context information may be received from sensors or devices that capture information about the vehicle or may be read from storage 103 where the vehicle context information is stored or received via communication device 108. The vehicle context information may be used to trigger the output 104 to provide manual release notification.

The vehicle context information may be provided by sensors or devices such as one or more from among a Global Positioning System (GPS) device, a speedometer, an odometer, an engine sensor, an emission sensor, a transmission sensor, a tire pressure sensor, a door ajar sensor, door lock status sensor, a trunk sensor, a window sensor, an interior/exterior temperature sensor, a barometric pressure sensor, an acceleration sensor, a gyroscopic sensor, a touch force or pressure sensor, a seat sensor, a passenger sensor, a collision sensor, an external object detector, an ultrasonic sensor, a radar sensor, a thermometer, an altimeter, an electronic control unit (e.g., an electronic controller, etc.), a car light activation sensor, a rain sensor, a snow sensor, a car key sensor, a car information and entertainment device (i.e., an infotainment device), a communication device, an ambient light sensor, etc.

The vehicle context information may include information on one or more from among an event associated with a vehicle, steering of a vehicle, turn indicator status, a speed of a vehicle, a location of a vehicle, an engine event or status, emission status, revolutions per minute of an engine, transmission status, tire pressure, door open/close status, trunk open/close status, window open/close status, interior/exterior temperature, barometric pressure, altitude of a vehicle, acceleration of a vehicle, user input, user applied pressure to an object or button in a vehicle, whether a passenger is in a seat, location and speed of external objects around the vehicle, which lights of a vehicle are activated, whether a car key or key code carrying device is present in a vehicle, a currently displayed screen on a display in a vehicle, daytime or nighttime status, an amount of ambient light, whether it is raining, whether it is snowing, a status of a vehicle, a status of a setting of a vehicle, and a location of a function that is executable by the user.

The communication device 108 may be used by manual release instruction apparatus 100 to communicate with various types of external apparatuses according to various communication methods. The communication device 108 may be used to send vehicle context information or a condition for providing a notification to operate a manual release to the controller 101 of the manual release instruction apparatus 100. The communication device 108 may also be configured to transmit the notification to operate a manual release of a vehicle to a mobile device such as mobile phone, smart watch, laptop, tablet, etc. so that the notification is output by the mobile device.

The communication device 108 may include various communication modules such as a broadcast receiving module, a near field communication (NFC) module, a GPS module, and a wireless communication module. The broadcast receiving module may include a terrestrial broadcast receiving module including an antenna to receive a terrestrial broadcast signal, a demodulator, and an equalizer, and a digital multimedia broadcasting (DMB) module to receive and process a DMB broadcast signal. The NFC module is a module that communicates with an external apparatus located at a nearby distance according to an NFC method. The GPS module is a module that receives a GPS signal from a GPS satellite and detects a current location. The wireless communication module is a module that is connected to an external network by using a wireless communication protocol such as Wi-Fi or IEEE communication protocol and communicates with the external network. The wireless communication module may further include a mobile communication module that accesses a mobile communication network and performs communication according to various mobile communication standards such as $3^{rd}$ generation (3G), $3^{rd}$ generation partnership project (3GPP), long term evolution (LTE), Bluetooth, or Zigbee.

According to an exemplary embodiment, the controller 101 of the manual release instruction apparatus 100 is configured to detect a condition for providing a notification to operate a manual release of the vehicle and to control to output the notification to operate the manual release based on the detected condition. The notification to operate a manual release may be an indicator light, displayed instructions or steps on how to operate a manual release, audible instructions or steps on how to operate a manual release, a spotlight directed to a manual release, etc. The manual release may be a manual door release or a manual trunk release of a vehicle.

According to one exemplary embodiment, the controller 101 of the manual release instruction apparatus 100 may be configured to detect an idle condition of a vehicle and an occupant of a vehicle. The idling condition may be a condition in which a vehicle is turned on, but is idle or not moving forward for a predetermined period time. For example, the vehicle transmission may be set to a park setting. If the controller 101 detects that the vehicle is occupied and the idle condition, the controller 101 may control the output 104 to provide training to the occupant. The training may include instructions provided in audio/visual form to instruct the occupant on how to operate a manual release.

FIG. 2 shows a flowchart for a method for providing instructions to operate a manual release of a vehicle device according to an exemplary embodiment. The method of FIG. 2 may be performed by the manual release instruction apparatus 100 or may be encoded into a computer readable medium as instructions that are executable by a computer to perform the method.

Referring to FIG. 2, a condition for providing a notification to operate a manual release of the vehicle is detected in operation S210. If the condition for providing a notification is detected (operation S210—YES), a notification to operate the manual release may be output based on the detected condition (operation S220).

FIG. 3 shows a table of conditions for providing a notification to operate a manual release according to an aspect of an exemplary embodiment. Referring to FIG. 3, the conditions to provide instructions may be stored in table form as in Table 1 or another data structure. Moreover, a setting to provide the notification for each condition may be toggled such that a notification is provided for certain conditions and not provided when other conditions occur. The conditions for providing a notification to operate a manual release may include one or more of performing a predetermined number of ignition cycles, an electronic door release failure, an electrical system failure, a charging system failure, a low power battery condition, a door lock switch failure, a door latch release switch failure, a body control module failure, a passive entry module failure, a passive start module failure, and a key fob transmitter not in vehicle.

According to one exemplary embodiment, an idle condition of a vehicle and an occupant of a vehicle may be detected. The idling condition may be a condition in which a vehicle is turned on, but is idle or not moving forward for a predetermined period time. For example, the vehicle transmission may be set to a park setting. If the vehicle is occupied and the idle condition is detected, training may be provided to the occupant. The training may include instructions provided in audio/visual form to instruct the occupant on how to operate a manual release.

FIG. 4A shows an example of a first type of notification to operate a manual release according to an aspect of another exemplary embodiment. Referring to FIG. 4A, a first type of notification 41 to operate a manual release is provided in a notification panel in the instrument cluster. The notification may contain an image showing the manual release, its location and textual instructions to operate the manual release. In addition, multiple screens may be provided showing additional steps or providing additional information about the manual release.

FIG. 4B shows an example of a second type notification to operate a manual release according to an aspect of another exemplary embodiment. Referring to FIG. 4B, a second type of notification 42 to operate a manual release is provided in a center console display in vehicle. The notification may contain an image showing the manual release, its location and textual instructions to operate the manual release. In addition, multiple screens may be provided showing additional steps or providing additional information about the manual release.

Figure 5A:
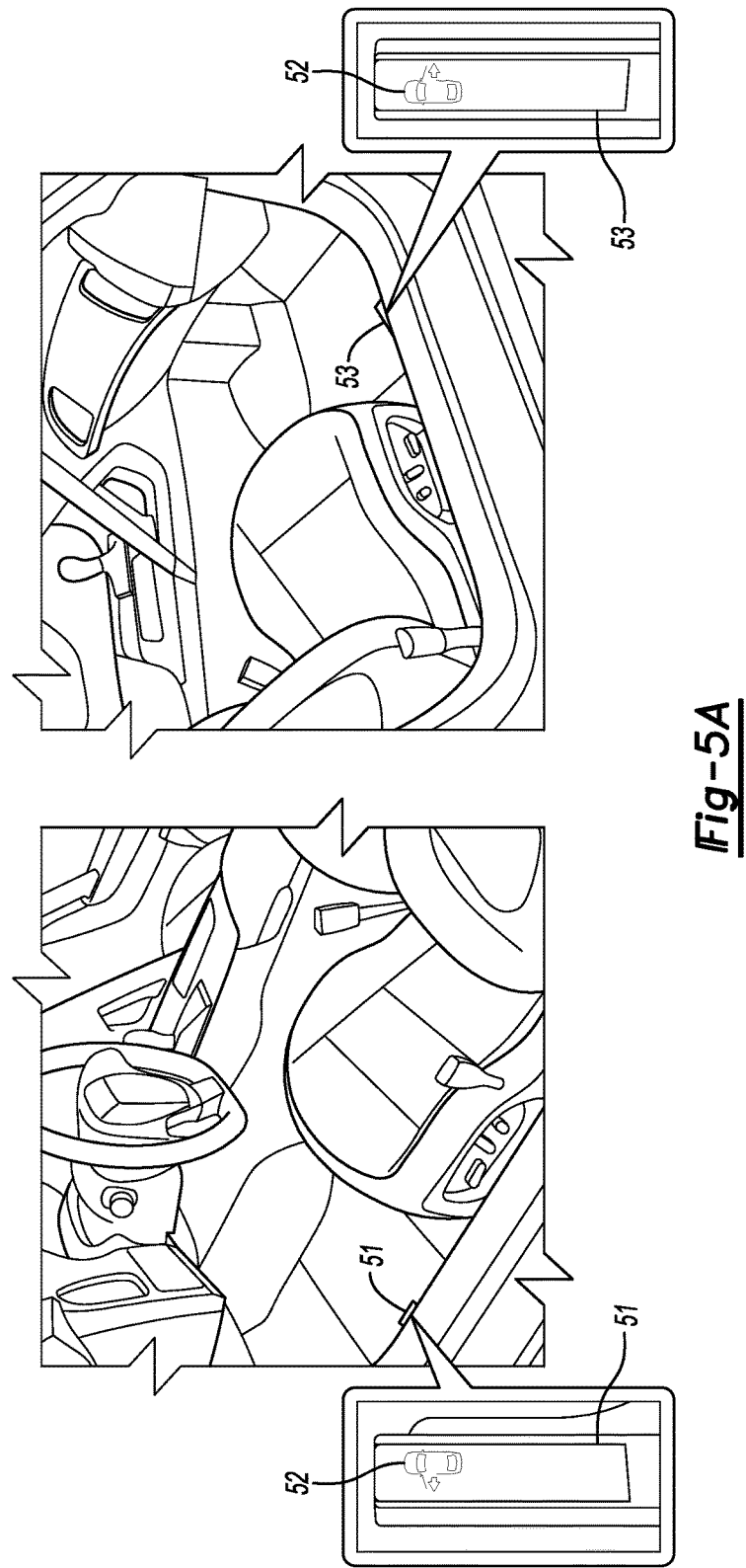
FIG. 5A shows an example of a first type of manual release according to an aspect of another exemplary embodiment.

FIG. 5A shows an example of a first type of manual release according to an aspect of another exemplary embodiment. Referring to FIG. 5A, the first type of manual release may be a manual driver door release 51 configured to open a driver side door. The first type of manual release may be a manual passenger door release 53 configured to open a passenger side door. The first type of manual release may further include an indicator light 52 that is configured to turn on based on a condition for providing a notification to operate a manual release.

FIG. 5B shows an example of a second type of manual release according to an aspect of another exemplary embodiment. Referring to FIG. 5B, the second type of manual release may be an external manual trunk release 54 configured to open a trunk of the vehicle from an external part of the vehicle. The second type of manual release may be an internal manual trunk door release 55 configured to open a trunk of the vehicle from an internal part of the vehicle. The second type of manual release may further include an indicator light 56 that is configured to turn on based on a condition for providing a notification to operate a manual release.

The processes, methods, or algorithms disclosed herein can be deliverable to/implemented by a processing device, controller, or computer, which can include any existing programmable electronic control device or dedicated electronic control device. Similarly, the processes, methods, or algorithms can be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

One or more exemplary embodiments have been described above with reference to the drawings. The exemplary embodiments described above should be considered in a descriptive sense only and not for purposes of limitation. Moreover, the exemplary embodiments may be modified without departing from the spirit and scope of the inventive concept, which is defined by the following claims.

What is claimed is:

1. A method for providing instructions to operate a manual release of a vehicle, the method comprising:
   detecting a condition for providing a notification to operate a manual release of the vehicle; and
   controlling to output the notification to a device in the vehicle based on the detected condition, wherein the condition for providing the notification to operate the manual release comprises at least one from among a predetermined number of ignition cycles, an electronic door release failure, an electrical system failure, a charging system failure, a low power battery condition, a post-crash condition, and a vehicle shut down condition, wherein the notification to operate the manual release comprises at least one from among an audible notification, a light notification, a haptic notification and a display notification, and wherein the notification includes at least one from among instructions on how to operate a manual release and instructions on a location of a manual release.

2. The method of claim 1, wherein the controlling to output the notification comprises controlling to transmit the notification to at least one from among a mobile device or the vehicle.

3. The method of claim 1, wherein the controlling to output the notification comprises controlling to output the audible notification through a speaker or other audible transducer of at least one from among a mobile device or the vehicle.

4. The method of claim 1, wherein the controlling to output the notification comprises controlling to output the notification at a display of at least one from among a mobile device or the vehicle.

5. The method of claim 1, wherein the controlling to output the notification comprises controlling to illuminate an indicator light of at least one from among an instrument cluster and the manual release.

6. The method of claim 1, wherein the vehicle comprises a manual release and an electronic door release, and wherein the controlling to output the notification comprises controlling to output instructions to operate the manual release instead of the electronic door release.

7. A non-transitory computer readable medium comprising computer executable instructions executable by a processor to perform the method of claim 1.

8. An apparatus for providing instructions to operate a manual release, the apparatus comprising:

at least one memory comprising computer executable instructions; and at least one processor configured to read and execute the computer executable instructions, the computer executable instructions causing the at least one processor to:

detect a condition for providing a notification to operate a manual release; and control to output the notification to operate the manual release based on the detected condition, wherein the condition for providing the notification to operate the manual release comprises at least one from among a predetermined number of ignition cycles, an electronic door release failure, an electrical system failure, a charging system failure, a low power battery condition, a post-crash condition, and a vehicle shut down condition, wherein the notification to operate the manual release comprises at least one from among an audible notification, a light notification, a haptic notification and a display notification, and wherein the notification includes at least one from among instructions on how to operate a manual release and instructions on a location of a manual release.

9. The apparatus of claim 8, wherein the at least one processor is further configured to control to output the notification by controlling to transmit the notification to at least one from among a mobile device or the vehicle.

10. The apparatus of claim 8, wherein the at least one processor is further configured to control to output the audible notification by controlling to output the notification through a speaker or other audible transducer of at least one from among a mobile device or the vehicle.

11. The apparatus of claim 8, wherein the at least one processor is further configured to control to output the notification by controlling to output the notification at a display of at least one from among a mobile device or the vehicle.

12. The apparatus of claim 8, wherein the at least one processor is further configured to control to output the notification by controlling to illuminate an indicator light of at least one from among an instrument cluster and the manual release.

13. The apparatus of claim 8, further comprising a vehicle comprising a manual release and an electronic door release, and wherein the at least one processor is further configured to control to output the notification by controlling to output instructions to operate the manual release instead of the electronic door release.

14. A non-transitory computer readable medium comprising computer executable instructions executable by a processor to perform a method for providing instructions to operate a manual release, the method comprising:

detecting a condition for providing a notification to operate a manual release instead of an electronic release; and controlling to output the notification to a device based on the detected condition, wherein the condition for providing the notification to operate the manual release comprises at least one from among a predetermined number of ignition cycles, an electronic door release failure, an electrical system failure, a charging system failure, a low power battery condition, a post-crash condition, and a vehicle shut down condition, wherein the notification to operate the manual release comprises at least one from among an audible notification, a light notification, a haptic notification and a display notification, and wherein the notification includes at least one from among instructions on how to operate a manual release and instructions on a location of a manual release.

* * * * *